United States Patent
Huang et al.

(10) Patent No.: US 10,009,410 B2
(45) Date of Patent: Jun. 26, 2018

(54) DESCRIPTION FILES AND WEB SERVICE PROTOCOLS FOR TASKING CAPABILITY ON INTERNET OF THINGS

(71) Applicant: National Central University, Taoyuan (TW)

(72) Inventors: Chih-Yuan Huang, Taoyuan (TW); Cheng-Hung Wu, New Taipei (TW)

(73) Assignee: NATIONAL CENTRAL UNIVERSITY, Taoyuan County (TW)

(*) Notice: Subject to any disclaimer, the term of this patent is extended or adjusted under 35 U.S.C. 154(b) by 174 days.

(21) Appl. No.: 15/228,139

(22) Filed: Aug. 4, 2016

(65) Prior Publication Data

US 2018/0041566 A1 Feb. 8, 2018

(51) Int. Cl.
*H04L 29/08* (2006.01)
*H04L 12/24* (2006.01)
*H04L 29/06* (2006.01)

(52) U.S. Cl.
CPC ............ *H04L 67/06* (2013.01); *H04L 41/20* (2013.01); *H04L 67/02* (2013.01); *H04L 67/42* (2013.01)

(58) Field of Classification Search
None
See application file for complete search history.

(56) References Cited

U.S. PATENT DOCUMENTS

| 7,774,391 B1* | 8/2010 | Le ................... G06F 17/30233 707/822 |
| 9,742,866 B2* | 8/2017 | Shribman ............... H04L 67/32 |
| 2007/0282806 A1* | 12/2007 | Hoffman .......... G06F 17/30067 |
| 2014/0244834 A1* | 8/2014 | Guedalia ................. H04L 67/16 709/224 |
| 2015/0067819 A1* | 3/2015 | Shribman ............... H04L 67/06 726/12 |
| 2017/0289253 A1* | 10/2017 | Graefe ................... H04L 67/12 |

* cited by examiner

*Primary Examiner* — Natisha D Cox
(74) *Attorney, Agent, or Firm* — Jackson IPG PLLC; Demian K. Jackson

(57) ABSTRACT

Description files and web service protocols for actuating things on Internet of things (IoT) are proposed. Essentials of every thing on IoT ('IoT thing') are defined in a description file. The description file is lightweight, versatile and standardized for web services. Thus, the IoT thing can be communicated through its protocol described in the description file. Therein, a keyword replacement method is used. In a command sent by a user at a client end, a specific keyword is used to replace an essential in the description file. Then, a complete message based on the protocol is generated to control the IoT thing. The present invention uniformly uses the same way for operating and managing IoT things of all brands and solving heterogeneity. The present invention significantly reduces development cost and may work out an automatic, high-performance and interoperable IoT ecosystem with applications.

8 Claims, 6 Drawing Sheets

```
{
  "Thing": {"ID": 10},
  "Description": "This capability description can control a smart light bulb.",
  "Parameters": [
    {
      "ParameterID": "on",
      "Description": "This parameter is used to turn on or off the smart light bulb.",
      "Use": "Mandatory",
      "Definition": {
        "InputType": "Boolean",
        "UnitOfMeasurement": "Status",
        "AllowedValues": [
          {"Value": true, "Description": "turn on this light bulb."},
          {"Value": false, "Description": "turn off this light bulb."}
        ]
      }
    }
  ],
  "HTTPProtocols": {
    "HTTPMethod": "PUT",
    "AbsoluteResourcePath": "http://140.115.111.190/api/lights/2/state",
    "MessageBody": "{\"on\": {on}}"
  },
  "Actuator": {"Metadata": "This actuator is for turning on and off the light bulb, a Phillips Hue."}
}
```

FIG.4

```
{
  "TaskingCapability": {
    "ID": 1
  },
  "Time": "2015/12/31T12:00:00",
  "Inputs": [
    {
      "ParameterID": "on",
      "Value": "true"
    }
  ]
}
```

FIG.5

DESCRIPTION FILES AND WEB SERVICE PROTOCOLS FOR TASKING CAPABILITY ON INTERNET OF THINGS

TECHNICAL FIELD OF THE INVENTION

The present invention relates to controlling IoT things on Internet of things (IoT); more particularly, relates to providing description files and web service protocols using a lightweight JavaScript Object Notation (JSON) format for protocols of IoT things, where a keyword replacement method is used to inherit a data model of the description files for describing the protocols with the data model and a placeholder "{ID}" is further used to package the protocols through the keyword replacement method for controlling the IoT things.

DESCRIPTION OF THE RELATED ARTS

Things on IoT are a global trend of development in recent years. The IoT things can be connected to the Internet through a variety of communication technologies so that the Internet of information world and the physical objects of the physical world are interconnected for users to control Internet-connected physical objects through the Internet.

These Internet-connected physical objects are called IoT things. In general, the IoT things have two major capabilities, namely the sensing capability and the tasking capability. The sensing capability uses all kinds of sensors embedded within an IoT thing to monitor the state or the surrounding environmental variables such as temperature, humidity and air quality of the IoT thing by itself. The tasking capability allows another IoT thing or a user to remotely control the IoT thing through the Internet or a various type of communication technique—for example, to remotely control a light bulb on and off. Through these two capacities, many novel physical mashup of automation applications can be achieved through a variety of IoT things.

Currently, there are available technologies, such as Web Services Description Language (WSDL), hRESTS (HTML for RESTful Services) and Universal Plug and Play (UPnP), based on Extensible Markup Language (XML) format. XML format is flexible and therefore easy to use, only that XML format occupies larger storage space. Yet, generally, IoT things are resource-constrained objects and the storage can be overburdened with the content written in XML.

Moreover, current IoT technologies have individual connectors for connecting IoT products through their specific protocols. That is, different brands of IoT things tend to use different communication platforms and protocols. Therefore, a user can only operate specific applications to control those IoT things. If the user wants to control different IoT things through a unified platform, he needs customized connectors to operate the IoT things, but still can not operate and manage those IoT things through a unified communication approach. For example, IFTTT (If This Then that) can only control customized IoT things through the IFTTT platform. This causes a lot of cost on developing IoT applications while only some IoT things supported are connected. AutoWoT is a simple connector for allowing end users to use an easy development method for connecting different IoT things, but corresponding connectors for the IoT things are still in need. In addition, although the Sensor Planning Service (SPS) standard of Open Geospatial Consortium (OGC) established protocols between users and web services, customized developments are still required for connecting web services and different IoT things.

In summary, there are the following disadvantages of the prior arts which need to improve:

1. At present, many standards use the XML format. The XML format is not a lightweight format as compared to JSON format, which may make IoT things whose computing capability is poor become un-applicable.

2. Existing technologies can not effectively connect different IoT things. Besides, available technologies of various manufacturers develop their own IoT ecosystems currently, so that different brands of IoT things are hard to be commonly used.

3. At present, most of the standards are defined by various manufacturers without universal permission, and OGC standards designed for IoT things are mainly about sensing capability, where few standards are dedicated to tasking capacity for the IoT things.

Hence, the prior arts do not fulfill all users' requests on actual use.

SUMMERY OF THE INVENTION

The main purpose of the present invention is to propose a data model for description files of IoT things and use a keyword replacement method to inherit the data model for controlling the IoT things, where the protocols is described and packaged through the keyword replacement method by using the data model with a placeholder "{ID}" for controlling the IoT things with the protocols and their metadata clearly defined in the description files for tasking capabilities.

To achieve the above purpose, the present invention are description files and web service protocols for tasking capability on IoT, comprising a communication device, a storage device and a processing device, where the communication device is connected to a web-service platform; the processing device is connected to the communication device and the storage device; description files of IoT things (IoT things) are registered to the web-service platform and the storage device stores the description files; the description files use a data model to describe different protocols of the IoT things; every one of the description files comprises essentials defined to communicate the IoT things; the essentials comprise a thing section, a tasking-capability section, an actuator section, an HTTP-protocol section, a parameter section, a definition section, an allowed-value section, a range section, and an authentication section; after the description file of one of the IoT things is registered in the web-service platform, the web-service platform assigns each tasking capability of the one of the IoT things with a unique identifier (ID) to process identification; the processing device has a method comprising the following steps: (a) the processing device receives a file request sent from a client end through the communication device to query a designated description file of a IoT thing; (b) according to the file request, the storage device is queried to respond the designated description file to the client end through the communication device; and (c) the client end sends a request to perform a task of the IoT thing, comprising the following steps: (c1) the client end sends the request to the processing device through the communication device; (c2) the processing device processes a keyword replacement method that the request and the data model in the designated description file are combined to be translated into a protocol specified by the IoT thing; and (c3) at a time designated in the request, the protocol specified is transmitted to control the IoT thing to perform the task. Accordingly, novel description files and web service protocols for tasking capability on IoT are obtained.

BRIEF DESCRIPTION OF THE DRAWINGS

The present invention will be better understood from the following detailed description of the preferred embodiment according to the present invention, taken in conjunction with the accompanying drawings, in which

FIG. 4 is the view showing the description file of Philips Hue;

FIG. 5 is the view showing the task request from the client end; and

DESCRIPTION OF THE PREFERRED EMBODIMENT

The following description of the preferred embodiment is provided to understand the features and the structures of the present invention.

Figure 1:
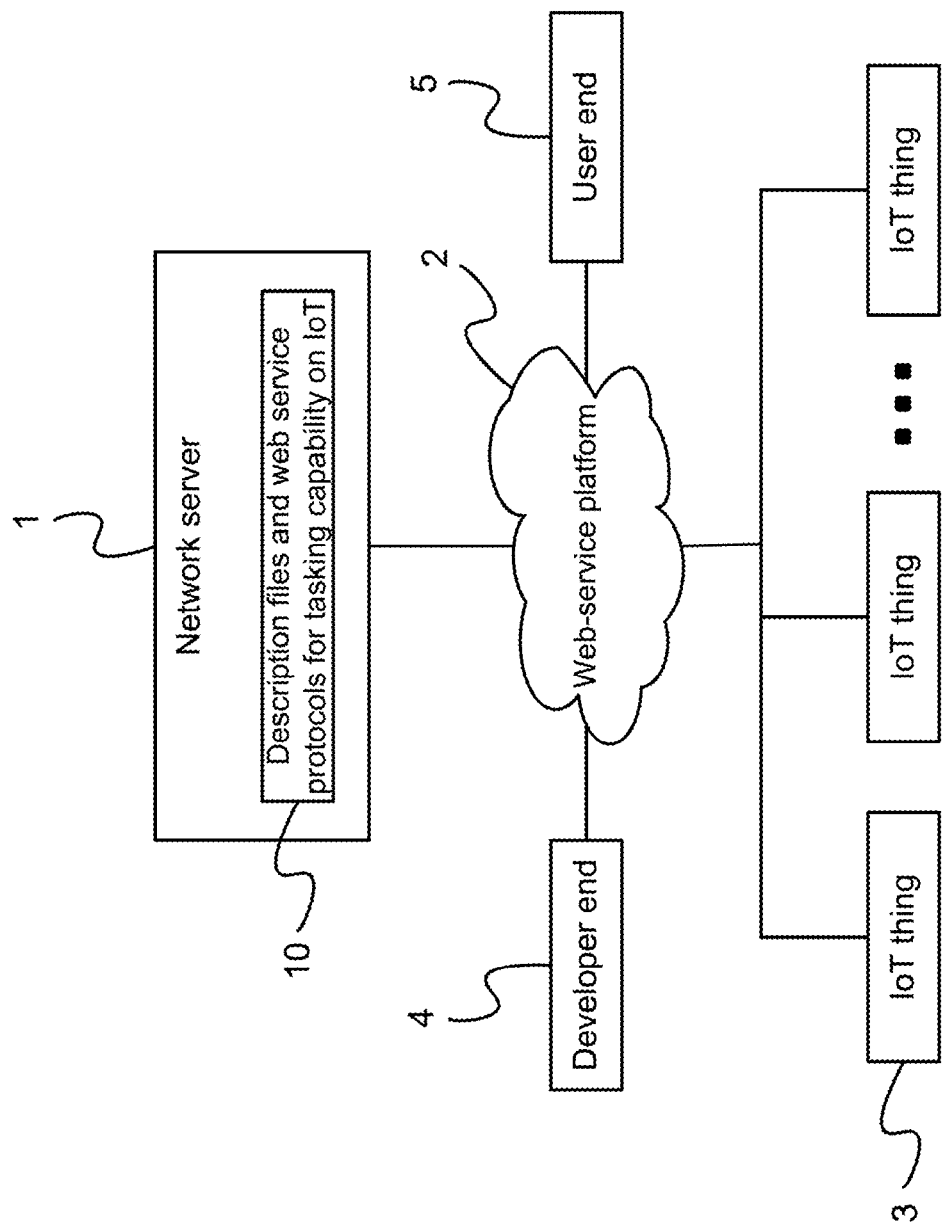
FIG. 1 is the view showing the application of the preferred embodiment according to the present invention.

Please refer to FIG. 1-FIG. 6, which are a view showing an application of a preferred embodiment according to the present invention; a view showing the preferred embodiment; a view showing a data model of description files; a view showing a description file of Philips Hue; a view showing a task request from a client end; and a flow view showing performing of the task request. As shown in FIG. 1, the present invention are description files and web service protocols for tasking capability on Internet of things (IoT) 10 and is applied in a network server 1. The network server 1 is connected to a number of different IoT things 3 through a web-service platform 2. The network server 1 processes data transmission with a developer end 4. The developer end 4 writes different description files 40 according to the IoT things 3 and sends and registers the description files 40 on the web-service platform 2. The network server 1 communicates with a client end 5 through the web-service platform 2, so that the client end 5 can query protocols and metadata of the registered IoT things 3. The IoT thing 3 can be an intelligent lighting, a webcam, other electronic item, etc.

Figure 2:
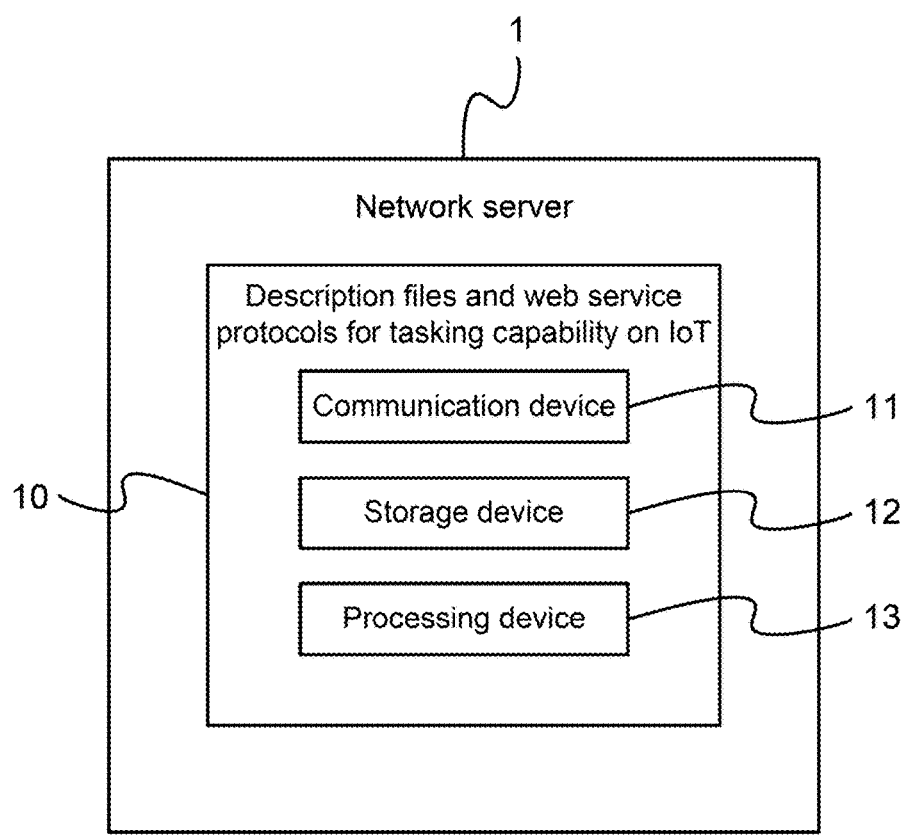
FIG. 2 is the view showing the preferred embodiment.

As shown in FIG. 2, the description files and web service protocols for tasking capability on IoT 10 comprises a communication device 11 connected to the web-service platform 2; a storage device 12 for storing the description files 40 of the IoT things 3 registered on the web-service platform 2; and a processing device 13 connected to the communication device 11 and the storage device 12. The processing device 13 receives a file request sent from the client end 5 through said communication device 11 to query a designated description file 40 of an IoT thing 3. According to the file request, the storage device 12 is queried to respond the designated description file 40 to the client end 5 through the communication device 11. Then, the client end 5 sends a request of a task to the processing device 13 through the communication device 11. The processing device 13 processes a keyword replacement method that the request and the data model in the designated description file 40 are combined to be translated into an HTTP request specified by the IoT thing 3. At the time specified in the request, the protocol specified is transmitted to control the IoT thing 3 to perform the task. Thus, novel description files and web service protocols for tasking capability on IoT 10 are obtained.

Mainly, the present invention proposes a data model to describe a protocol of the IoT thing 3 and uses the keyword replacement method to inherit the data model in the description file 40 that a method for describing the protocol in the data model is further used with a placeholder "{ID}" to assemble the protocol of the IoT thing 3. In the description file 40 for tasking capability, the protocol and metadata of the IoT thing 3 are clearly defined for controlling the IoT thing 3. Therefore, the present invention is to design the data model and the keyword replacement method.

Figure 3:
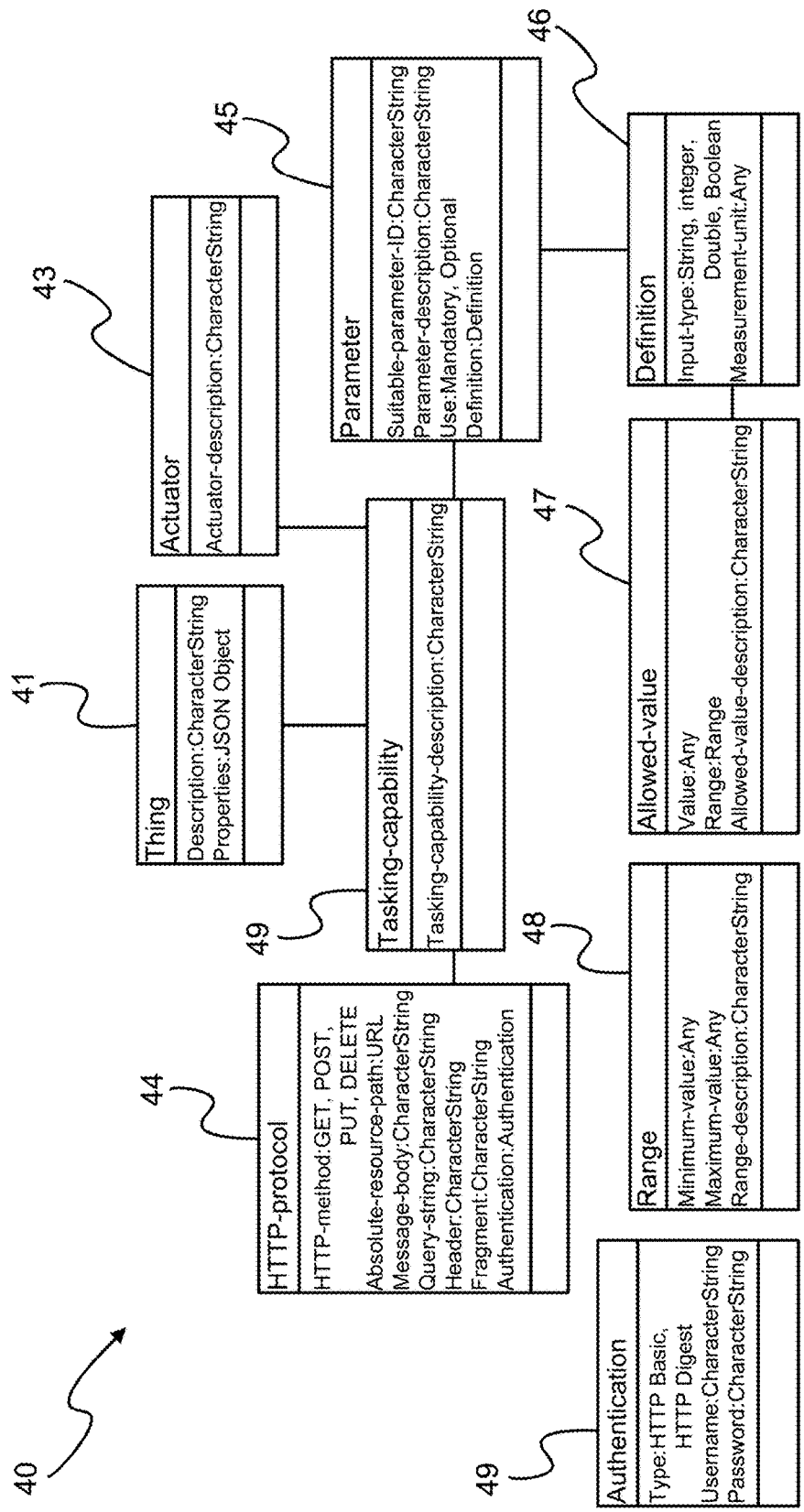
FIG. 3 is the view showing the data model of description files.

As shown in FIG. 3, a data model of description files 40 is used to describe different protocols of the IoT things 3. Every one of the description files 40 comprises essentials defined to communicate an IoT thing 3. The essentials comprise a thing section 41, a thing section 42, an actuator section 43, an HTTP-protocol section 44, a parameter section 45, a definition section 46, an allowed-value section 47, a range section 48 and an authentication section 49. The following are the definitions of the essentials with examples illustrating the concepts of the present invention:

The thing section 41: The thing section 41 refers to all kinds of IoT things, comprising a description section and a properties section. An IoT thing 3 can be described through metadata of the description and properties sections. For example, an Internet-connected lighting device can be described here. Through the description file, the client end 5 can understand the metadata of the IoT thing 3. Through pairing the Key-Value of the characteristics, the properties section identifies the IoT thing 3.

The tasking-capability section 42: The tasking capacity is defined as a service of the IoT thing 3 provided through an actuator, comprising a tasking-capability-description section. The tasking-capability-description section provides a description of the tasking capacity. In fact, the description of the tasking capacity is located in other sections, including the HTTP-protocol section and the parameter section. The HTTP-protocol section defines the protocol required for the tasking capacity to communicate with the outside. The parameter section is responsible for describing suitable instruction parameters of the tasking capacity to be transferred through the HTTP protocol.

The actuator section 43: The actuator section 43 comprises an actuator description section, which is mainly used to provide metadata of the actuator. An IoT thing 3 may have a plurality of actuators. For example, a webcam can be classified as an IoT thing, within which contains an actuator for zooming and an actuator for changing viewing angle. The present invention separately describes actuators of different tasking capacities in details.

The HTTP-protocol section 44: Communications on IoT use different transmission platforms. For example, the sections defined for the description file in this document is focused on the Hypertext Transfer Protocol (HTTP); but, in the future, a similar strategy may be used and extended to other protocols, such as Zigbee, Bluetooth, etc. As is stated, the present invention focuses on the description file for the HTTP protocol. The HTTP-protocol section 44 defines protocols and interfaces of the actuators, whose properties are shown in Table 1. The HTTP-protocol section 44 comprises an HTTP-method section that can be GET, POST, PUT, DELETE, and other HTTP methods; an absolute-resource-path section that is a Uniform resource Locator (URL); a message-body section; a query-string section; a header section; a fragment section; and an authentication section. With the above information, a complete HTTP request is formed.

TABLE 1

| Section | Description | Data pattern or value |
| --- | --- | --- |
| HTTP-method section | HTTP method | Get, post, put, delete, etc. |
| Absolute-resource-path section | Path of the protocol | URL |
| Message-body section | HTTP message body | Character String |
| Query-string section | HTTP query string | Character String |
| Header section | HTTP header | Character String |
| Fragment section | HTTP fragment | Character String |
| Authentication section | Authentication method used by the IoT thing | Authentication |

The parameter section 45: The parameter section 45 defines suitable values of the actuator, whose sections are shown in Table 2. The sections comprise a suitable-parameter-ID section that a unique identifier (ID) is given for representing this parameter of the actuator; a parameter-description section that an interpretation is provided for the user to easily understand this parameter; a use section for describing this parameter a mandatory or optional one; and a definition section that details and suitable values of this parameter are described.

TABLE 2

| Section | Description | Data pattern or value |
| --- | --- | --- |
| Suitable-parameter-ID section | Unique identifier of the parameter | Character String |
| Parameter-description section | Interpretation of the parameter | Character String |
| Use section | Parameter necessity | Mandatory, optional |
| Definition section | Details and suitable values of the parameter | Definition |

The definition section 46: Sections of the definition section 46 are shown in Table 3, comprising an input-type section that suitable data type and value range of the parameter is described and the data type can be string, integer, double and boolean; and a measurement-unit section that the value unit of the parameter is recorded.

TABLE 3

| Section | Description | Data pattern or value |
| --- | --- | --- |
| Input-type section | Suitable data type and value range of the parameter | String, Integer, Float, Boolean |
| Measurement-unit section | Value unit of the parameter | Any |

The allowed-value section 47: Sections of the allowed-value section 47 are shown in Table 4, comprising a value section that an allowed value of the parameter is described; a range section that a range of the allowed value is described; and an allowed-value-description section that the definition of the value inputted for the parameter is described.

TABLE 4

| Section | Description | Data pattern or value |
| --- | --- | --- |
| Value section | Allowed value of the parameter | Any |
| Range section | Range of allowed value | Range |
| Allowed-value-description section | Definition of value inputted for the parameter | Character String |

The range section 48: Sections of the range section 48 are shown in Table 5, comprising a minimum-value section that describes the allowed minimum value of the parameter; a maximum-value section that describes the allowed maximum value of the parameter; and a range-description section that describes definition of the input range of the parameter.

TABLE 5

| Section | Description | Data pattern or value |
| --- | --- | --- |
| Minimum-value section | Allowed minimum value of the parameter | Any |
| Maximum-value section | Allowed maximum value of the parameter | Any |
| Range-description section | Definition of the input range of the parameter | Character String |

The authentication section 49: Sections of the authentication section 49 are shown in Table 6, comprising a type section that describes the HTTP authentication type, which can be HTTP Basic or HTTP Digest; a username section that is a username recognized by the IoT thing; and a password section that is a user password recognized by the IoT thing.

TABLE 6

| Section | Description | Data pattern or value |
| --- | --- | --- |
| Type section | Type of HTTP authentication | HTTP Basic, HTTP Digest |
| Username section | Username recognized by the IoT thing | Character String |
| Password section | User password recognized by the IoT thing | Character String |

Through the above information, a user at the client end 5 can understand definitions of parameters supported by the tasking capabilities and their allowed values; and, thus, suitable task requests can be sent for meeting user's needs. For example, there is an Internet-connected lighting device which can accept a parameter ID named "on" for turning on or off. Its description section is "Through this parameter, the user can turn on or off this intelligent lighting." Its use section is "mandatory", which means the "on" parameter is always required for sending a task through this tasking capacity. Its input-type section describes that the type of the value is boolean, namely "true" or "false." Therefore, through the parameter section 45, the suitable parameter of the tasking capacity of the IoT thing is fully described and, thereby, the user at the client end understands and controls the tasking capacity of the IoT thing through a unified data standard.

Furthermore, the present invention proposes a solution that supports the HTTP protocols of various IoT things. The user at the client end 5 inputs parameter at different location according to the various IoT things. Accordingly, the present invention further proposes the keyword replacement method to support a variety of possible HTTP protocols. To say in a simple way, in the HTTP-protocol section 44, the IoT thing 3 uses the placeholder "{ID}" to indicate the location for the user at the client end 5 to input parameter and, before sending an HTTP request to the IoT thing, the placeholder will be replaced by the parameter actually inputted by the user at the client end 5.

As shown in FIG. 4, the present invention takes an internet-connected lighting device "Philips Hue" as an example. In the parameter section, the allowed parameter ID (ParameterID) section is "on" and its allowed value is boolean including "true" and "false". The value "true" will "turn on the light bulb"; and the value "false" will "turn off the light bulb". In addition, in the HTTP-protocol section, the HTTP method used by the actuator is "put" with the absolute resource path as "http://140.115.111.190/api . . . /lights/2/state" and the message body as '{"on":{on}}'. Hence, when the user at the client end enters a task request to turn on the intellectual lighting according to the format shown in Table 7, the placeholder "{on}" can be found through the ParameterID "on" coordinated with the brackets "{ }" to replace the placeholder by the parameter inputted in the task request for further generating the HTTP PUT request of the task.

TABLE 7

| Section | Description | Data pattern or value |
| --- | --- | --- |
| Tasking-capability ID (TaskingCapability) | ID of the tasking capability to be controlled | Integer |
| Input parameters (Inputs) | Input parameters and values of the task (the parameter ID must be mentioned in the tasking capability) | JSONArray |
| Execution time (Time) | Estimated time to perform the task | yyyy/MM/dd'T' HH:mm:ss |

The present invention proposes the keyword replacement method to support a variety of protocols of the IoT things. As long as the placeholder is located at the correct location, the parameter inputted by the user at the client end can be automatically put at a place in the absolute-resource-path section, the message-body section, the query-string section, the header section or the fragment section. The present invention is not only extremely simple and intuitive, but also very common and effective. Through the present invention, protocols of the IoT things can be unified.

The present invention uses the lightweight JavaScript Object Notation (JSON) format as a standard of the description files for tasking capacities. All IoT things can follow this standard to describe their tasking capacities and protocols. Thus, the user at the client end can understand the tasking capacities of the IoT things through the data model developed in the present invention; and, then, the IoT things can be controlled through writing task requests. As shown in FIG. 5, because the tasks requested by the user at the client end still needs to be converted into HTTP protocols supported by the IoT things, the standard for tasking capacities is built on a network service. The IoT things use the data model to describe its tasking capacities and register them on the web-service platform for providing the user at the client end to query tasking capacities on IoT through the web-service platform and sending tasks to the web-service platform. Then, the web-service platform further converts the tasks sent by the user at the client end into HTTP protocols supported by the IoT things to control the IoT things.

Figure 6:
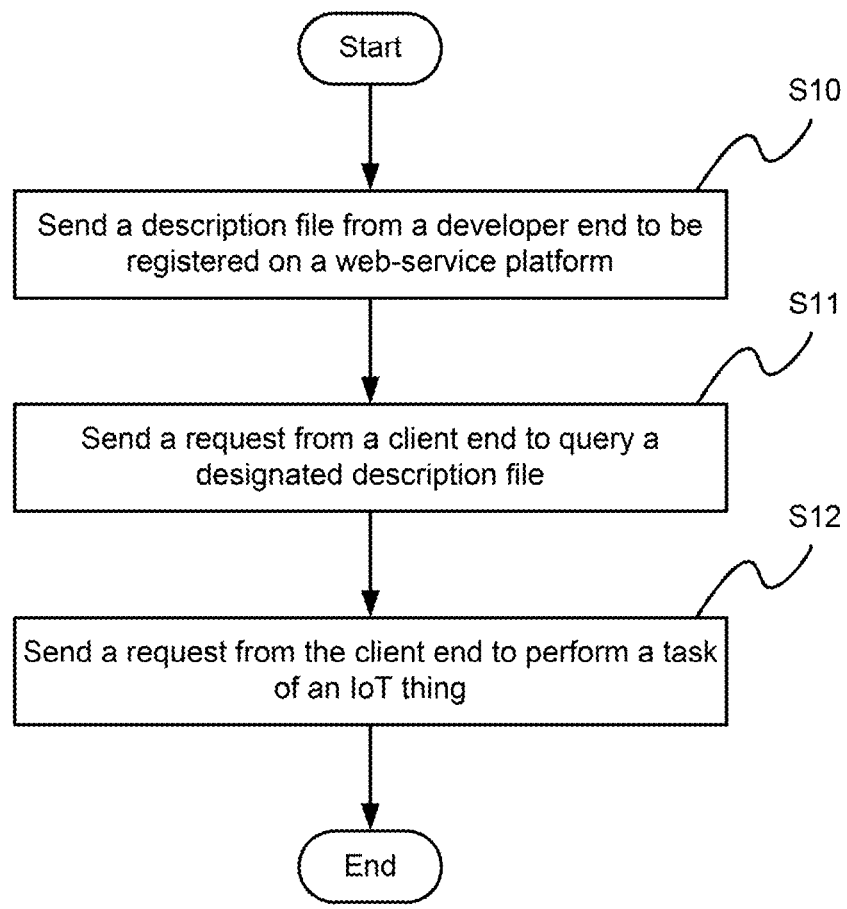
FIG. 6 is the flow view showing the performing of the task request.

In FIG. 6, the main operational flow is shown.

In step S10, no matter the developer directly writes the description files for the tasking capacities of the IoT things or the user himself or herself writes the description files for the tasking capacities according to the protocols of the IoT things, the description files will be made in line with the data model proposed in the present invention. After the description files are uploaded and registered on the web-service platform by the user or by the IoT things themselves, the web-service platform will assign each tasking capability of the IoT thing with a unique identifier (ID) for identification.

In step S11, the user at the client end can send a request to query the contents of a designated description file and then acquire information of the registered IoT thing, its tasking capacities and parameters of the supported tasking capacities.

In step S12, based on the acquired information of the tasking capacity, the user at the client end can generate a task request to be sent to the web-service platform. The web-service platform will use the keyword replacement method proposed by the present invention to combine the parameters inputted in the task request by the user at the client end together with the data model in the designated description file to be translate into an HTTP request of the IoT thing. At a time specified in the task request, the HTTP request is sent to the IoT thing to perform the task.

For the developers, they only have to learn the protocols proposed by the present invention for communicating with a variety of IoT things and further connecting and tasking all IoT things.

The present invention proposes a description file of tasking capacity based on JSON format, where the description file is different from all kinds of standards currently used; and a web service protocol supporting the description file:

1. A lightweight JSON format is used to write description files of protocols of IoT things. The JSON format is as flexible and easy to use as the XML format yet the file size is a more lightweight one than that of the XML format, so that the description files can support the majority of the IoT things.

2. The present invention proposes a standard dedicated to tasking capacities of the IoT things, whose purpose is to create a unified and standardized method to describe all kinds of IoT things. Through a data model proposed by the present invention, a standardized method is provided to describe the protocols and their metadata of the IoT things. Because the present invention describes and controls the IoT things in a uniform way, software application developers can easily use a uniform web service protocol to connect with different IoT things for connection without binding to a specific IoT ecosystem. Hence, the development cost is significantly reduced for software developers.

3. As stated, the present invention uses the data model to describe the protocols of the IoT things; and the keyword replacement method is used that the placeholder "{ID}" in the data model is replaced by a parameter value the user wants to input. Thus, all of the difference IoT things can be described and automatically controlled in the same way by using the data model for achieving the purpose of operating the IoT things in a unified way. Moreover, the software application developers do not need to spend extra cost to develop connectors for the IoT things.

Hence, for solving the problem of heterogeneous protocols, the present invention proposes a standardized description for web services. Through this standardized description, lightweight and versatile description files are obtained. The description files describe different protocols of IoT things. In each description, essentials for communicating the IoT things are defined. A keyword replacement method is used, where an essential in the description for a web service of an IoT thing is replaced by a specific keyword obtained from a command sent by a user at a client end; and a complete protocol is thus formed to achieve the purpose of controlling the IoT thing. The present invention allows IoT things of all brands uniformly apply the same way for operation and management with the problem of heterogeneity solved. For the IoT products and application developers, the present invention can significantly reduces development cost. In the future, the present invention can achieve an automatic, high-performance and interoperable IoT ecosystem with applications.

To sum up, the present invention are description files and web service protocols for tasking capability on IoT, where lightweight and universal description files are designed through a standardized description to describe protocols of different IoT things; in each description, essentials for communicating an IoT thing is defined; a keyword replacement method is used that an essential in the description for a web service of the IoT thing is replaced by a specific keyword obtained from a command sent by a user at a client end; a complete protocol is thus formed to achieve the purpose of controlling the IoT thing; IoT things of all brands can be uniformly applied in the same way for operation and management with the problem of heterogeneity solved; for the IoT products and application developers, development cost is significantly reduced; and, in the future, the present invention can achieve an automatic, high-performance and interoperable IoT ecosystem with applications.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of description files and web service protocols for tasking capability on Internet of things (IoT), comprising
    a communication device,
        wherein said communication device is connected to a web-service platform;
    a storage device,
        wherein description files of IoT things are registered to said web-service platform and said storage device stores said description files;
        wherein said description files use a data model to describe different protocols of said IoT things;
        wherein every one of said description files comprises essentials defined to communicate said IoT things;
        wherein said essentials comprise a thing section, a tasking-capability section, an actuator section, an HTTP-protocol section, a parameter section, a definition section, an allowed-value section, a range section, and an authentication section; and
        wherein, after said description file of one of said IoT things is registered in said web-service platform, said web-service platform assigns each tasking capability of said one of said IoT things with a unique identifier (ID) to process identification; and
    a processing device,
        wherein said processing device is connected to said communication device and said storage device; and
        wherein said processing device has a method comprising the following steps:
        (a) said processing device receives a file request sent from a client end through said communication device to query a designated description file of a IoT thing;
        (b) according to said file request, said storage device is queried to respond said designated description file to said client end through said communication device; and
        (c) said client end sends a request to perform a task of said IoT thing, comprising the following steps:
            (c1) said client end sends said request to said processing device through said communication device;
            (c2) said processing device processes a keyword replacement method that said request and said data model in said designated description file are combined to be translated into a protocol specified by said IoT thing; and
            (c3) at a time designated in said request, said protocol specified is transmitted to control said IoT thing to perform said task.

2. The apparatus according to claim 1,
    wherein, through said communication device, said processing device receives said description files of said IoT things sent from developer ends and saves said description files in said storage device.

3. The apparatus according to claim 1,
    wherein said essentials are defined in every one of said description files as follows:
        (a) said thing section comprises a description section and a properties section;
        (b) said tasking-capability section comprises a tasking-capability-description section;
        (c) said actuator section comprises an actuator-description section;
        (d) said HTTP-protocol section comprises an HTTP-method section, an absolute-resource-path section, a message-body section, a query-string section, a header section, a fragment section and an authentication section;
        (e) said parameter section comprises a suitable-parameter-ID section, a parameter-description section, a use section and a definition section;
        (f) said definition section comprises an input-type section and a measurement-unit section;
        (g) said allowed-value section comprises a value section, a range section and an allowed-value-description section;
        (h) said range section comprises a minimum-value section, a maximum-value section and a range-description section; and
        (i) said authentication section comprises a type section, a username section and a password section.

4. The apparatus according to claim 1,
    wherein, in step (c2), said processing device processes said keyword replacement method that a placeholder ({ID}) located on said data model in said designated description file is replaced by a parameter inputted in said request of said task.

5. The apparatus according to claim 4,
    wherein said parameter inputted in said request is automatically placed in a section of said HTTP-protocol section; and said section is selected from a group consist of an absolute-resource-path section, a message-body section, a query-string section, a header section and a fragment section.

6. The apparatus according to claim 1,
wherein, after obtaining information of a tasking capability of a registered IoT thing through said processing device, said client end generates said request of said task and sends said request to said processing device; and
wherein said information comprises a description of said tasking capability; and at least one parameter supported by said tasking capability.

7. The apparatus according to claim 1,
wherein a format used by said description files is JavaScript object notation (JSON) format.

8. The apparatus according to claim 1,
wherein said description files support various protocols used on IoT and one of said protocols is hypertext transfer protocol (HTTP).

\* \* \* \* \*